United States Patent
Okazaki

(10) Patent No.: US 9,840,444 B2
(45) Date of Patent: Dec. 12, 2017

(54) PRODUCTION METHOD OF CERAMIC HONEYCOMB STRUCTURE, AND CERAMIC HONEYCOMB STRUCTURE

(71) Applicant: HITACHI METALS, LTD., Minato-ku, Tokyo (JP)

(72) Inventor: Shunji Okazaki, Miyako-gun (JP)

(73) Assignee: HITACHI METALS, LTD., Tokyo (JP)

(*) Notice: Subject to any disclaimer, the term of this patent is extended or adjusted under 35 U.S.C. 154(b) by 380 days.

(21) Appl. No.: 14/350,925

(22) PCT Filed: Oct. 9, 2012

(86) PCT No.: PCT/JP2012/076140
§ 371 (c)(1),
(2) Date: Apr. 10, 2014

(87) PCT Pub. No.: WO2013/054793
PCT Pub. Date: Apr. 18, 2013

(65) Prior Publication Data
US 2014/0295132 A1    Oct. 2, 2014

(30) Foreign Application Priority Data
Oct. 11, 2011    (JP) .................... 2011-224389

(51) Int. Cl.
*B05D 3/00*    (2006.01)
*C04B 38/00*    (2006.01)
(Continued)

(52) U.S. Cl.
CPC ...... *C04B 38/0009* (2013.01); *B01D 46/0001* (2013.01); *C04B 41/009* (2013.01);
(Continued)

(58) Field of Classification Search
CPC .............. C04B 38/0009; C04B 41/009; C04B 38/0006; C04B 41/89; B01D 46/0001
See application file for complete search history.

(56) References Cited

U.S. PATENT DOCUMENTS 4,576,863 A * 3/1986 Donomoto ............. B22D 19/14
                                                  428/325
5,334,570 A * 8/1994 Beauseigneur .......... B01J 23/40
                                                  502/240
(Continued)

FOREIGN PATENT DOCUMENTS

CN    101679133 A    3/2010
JP    5-269388 A     10/1993
(Continued)

OTHER PUBLICATIONS

Oxford online dictionary definition of "colloid" retrieved from https://en.oxforddictionaries.com/definition/colloid on May 18, 2017.*

(Continued)

*Primary Examiner* — Nathan Empie
(74) *Attorney, Agent, or Firm* — Sughrue Mion, PLLC

(57) ABSTRACT

A method for producing a ceramic honeycomb structure comprising a ceramic honeycomb body having large numbers of longitudinal cells partitioned by porous cell walls having porosity of 50% or more, and a peripheral wall formed on a peripheral surface of the ceramic honeycomb body, comprising the steps of extruding moldable ceramic material to form a honeycomb-structured ceramic green body; machining a peripheral portion of the green body or a sintered body obtained from the green body to remove part of cell walls in the peripheral portion to obtain a ceramic honeycomb body having longitudinal grooves on a peripheral surface; applying colloidal metal oxide to a peripheral surface of the ceramic honeycomb body and drying it, and (Continued)

then applying a coating material comprising ceramic aggregate having an average particle size of 1 μm or more to form the peripheral wall.

4 Claims, 3 Drawing Sheets

(51) Int. Cl.

| | |
|---|---|
| C04B 41/89 | (2006.01) |
| C04B 41/00 | (2006.01) |
| B01D 46/00 | (2006.01) |
| C04B 41/52 | (2006.01) |
| C04B 111/00 | (2006.01) |
| F01N 3/28 | (2006.01) |

(52) U.S. Cl.
CPC .............. *C04B 41/52* (2013.01); *C04B 41/89* (2013.01); *C04B 2111/0081* (2013.01); *F01N 3/2825* (2013.01); *F01N 3/2828* (2013.01); *Y10T 428/24149* (2015.01)

(56) References Cited

U.S. PATENT DOCUMENTS

| | | | |
|---|---|---|---|
| 5,629,067 A | 5/1997 | Kotani et al. | |
| 7,497,999 B2 | 3/2009 | Ichikawa | |
| 7,591,918 B2 | 9/2009 | Suwabe et al. | |
| 7,727,613 B2 | 6/2010 | Suwabe et al. | |
| 8,642,137 B2 | 2/2014 | Okazaki | |
| 2005/0106317 A1* | 5/2005 | Shino | B41M 5/502 427/180 |
| 2005/0129590 A1 | 6/2005 | Ichikawa | |
| 2006/0105139 A1 | 5/2006 | Suwabe et al. | |
| 2006/0121240 A1* | 6/2006 | Hirai | B01J 21/14 428/116 |
| 2006/0210764 A1 | 9/2006 | Yamada et al. | |
| 2006/0217256 A1* | 9/2006 | Katoh | B01D 39/2093 501/1 |
| 2007/0158879 A1 | 7/2007 | Suwabe et al. | |
| 2008/0220203 A1* | 9/2008 | Ichikawa | B01D 46/0036 428/116 |
| 2010/0080930 A1* | 4/2010 | Okazaki | B01D 46/0001 427/541 |
| 2010/0151185 A1 | 6/2010 | Okazaki | |
| 2012/0100336 A1* | 4/2012 | Cai | B01D 46/2444 428/116 |

FOREIGN PATENT DOCUMENTS

| | | | | |
|---|---|---|---|---|
| JP | 2003-284923 A | 10/2003 | | |
| JP | 2004-175654 A | 6/2004 | | |
| JP | 2006-255542 A | 9/2006 | | |
| JP | 2011-194317 A | 10/2011 | | |
| WO | WO 0145828 A1 * | 6/2001 | ........... | B01D 53/945 |

OTHER PUBLICATIONS

Communication dated Feb. 9, 2015, issued by the State Intellectual Property Office of the People's Republic of China in counterpart Application No. 201280050065.6.

* cited by examiner

PRODUCTION METHOD OF CERAMIC HONEYCOMB STRUCTURE, AND CERAMIC HONEYCOMB STRUCTURE

CROSS REFERENCE TO RELATED APPLICATIONS

This application is a National Stage of International Application No. PCT/JP2012/076140 filed Oct. 9, 2012 (claiming priority based on Japanese Patent Application No. 2011-224389 filed Oct. 11, 2011), the contents of which are incorporated herein by reference in their entirety.

FIELD OF THE INVENTION

The present invention relates to a method for producing a ceramic honeycomb structure, and a ceramic honeycomb structure.

BACKGROUND OF THE INVENTION

To remove toxic materials from exhaust gases discharged from internal combustion engines of automobiles, etc., ceramic honeycomb structures are used for exhaust-gas-cleaning catalyst converters, particulate matter (PM)-capturing filters, and carriers for catalysts for removing nitrogen oxides (NOx).

As shown in FIGS. 1(a) and 1(b), a ceramic honeycomb structure 1 comprises a ceramic honeycomb body 10 having large numbers of longitudinal cells 14 partitioned by porous cell walls 13, and a peripheral wall 11 formed on a periphery of the ceramic honeycomb body 10, with a substantially circular or ellipsoidal cross section perpendicular to its flow paths [see FIG. 1(a)]. The ceramic honeycomb structure 1 is assembled in a metal container (not shown), in which it is fixed in a holding member (not shown) formed by a metal mesh or ceramic mat, etc. Accordingly, the peripheral wall 11 should have enough isostatic strength to withstand heat shock in a state where the ceramic honeycomb structure 1 is held by the holding member.

To reduce the amount of nitrogen oxides (NOx) contained in exhaust gases of diesel engines, ceramic honeycomb structures carrying NOx catalysts on cell walls are used. To provide the ceramic honeycomb structures with higher NOx-cleaning capacity, it is effective to increase the amount of a catalyst carried. To this end, cell walls should have as high porosity as, for example, 50% or more.

JP 05-269388 A discloses a ceramic honeycomb structure comprising a ceramic honeycomb body having large numbers of longitudinal cells partitioned by porous cell walls, and longitudinal grooves open on the peripheral surface, and a peripheral wall formed by a coating material filled in the grooves. This ceramic honeycomb structure is produced by forming a sintered ceramic honeycomb body integral with a peripheral wall by a known method, removing peripheral cells by grinding to form a ceramic honeycomb body having grooves on the peripheral surface, filling the grooves on the peripheral surface with a coating material paste comprising ceramic particles and/or ceramic fibers and colloidal silica or colloidal alumina and drying it to form the peripheral wall. JP 05-269388 A describes that such method produces a ceramic honeycomb structure having a reinforced peripheral portion, with excellent heat resistance and heat shock resistance.

However, when the peripheral wall described in JP 05-269388 A is formed in a ceramic honeycomb structure comprising cell walls having as high porosity as, for example, 50% or more, the peripheral wall fails to exhibit a sufficient strength-improving effect because of extremely low strength of the cell walls, resulting in a ceramic honeycomb sintered body failing to having enough isostatic strength to withstand heat shock during use.

JP 2004-175654 A discloses a ceramic honeycomb structure comprising a ceramic honeycomb body having large numbers of longitudinal cells partitioned by porous cell walls and longitudinal grooves open on the peripheral surface, and a peripheral wall filling the grooves, with stress-releasing portions (voids) at least partially in the peripheral wall or between the peripheral wall and the grooves. JP 2004-175654 A describes that even if it were subject to heat shock, cracks due to heat shock would not easily propagate to cell walls, resulting in excellent heat shock resistance. This ceramic honeycomb structure is produced by forming a sintered ceramic honeycomb body integral with a peripheral wall by a known method, removing part of cell walls in the peripheral wall by machining to form a honeycomb body having grooves on a peripheral surface, applying a coating material comprising ceramic aggregate and an inorganic binder to substantially fill the grooves, and rapidly drying the coating material in a drying furnace at 70° C. or higher.

However, because the ceramic honeycomb structure described in JP 2004-175654 A has stress-releasing portions (crack-like voids open on an outer surface of the peripheral wall, or gaps between the ceramic honeycomb body and the peripheral wall), the peripheral wall is easily detachable from the ceramic honeycomb body. Particularly when the method described in JP 2004-175654 A is used for the production of a ceramic honeycomb body comprising cell walls having as high porosity as, for example, 50% or more, the resultant ceramic honeycomb body does not have sufficient isostatic strength.

JP 2006-255542 A discloses a ceramic honeycomb structure comprising a cellular structure having pluralities of cells partitioned by porous cell walls, and an outer wall formed by a coating material comprising ceramic particles having an average particle size of 20-50 μm on a peripheral surface of the cellular structure, the porosity of the outer wall being smaller in an outer region than in an inner region in a thickness direction. JP 2006-255542 A describes that the ceramic honeycomb structure has excellent durability and wear resistance because of little detachment of ceramic particles from the outer wall, and that printings on the outer wall surface are resistant to wear and damage. The ceramic honeycomb structure described in JP 2006-255542 A is produced by removing a peripheral portion from a honeycomb-structured sintered body formed by a known method by grinding, applying a coating material to the peripheral surface to form a peripheral coating layer, drying the peripheral coating layer completely or partially, and applying a coating material comprising colloidal ceramic such as colloidal silica, colloidal alumina, etc. as a main component to the peripheral coating layer to form a dense layer.

The peripheral wall described in JP 2006-255542 A, which has a porosity gradient, has excellent wear resistance and damage resistance in printings on the surface. However, when this peripheral coating layer is formed on a ceramic honeycomb body comprising cell walls having as high porosity as, for example, 50% or more, it is easily detached from the peripheral surface of the ceramic honeycomb body, because cell walls are extremely brittle. This means that the coated peripheral wall has poor adhesion to the ceramic honeycomb body.

JP 2003-284923 A discloses, as shown in FIG. 5, a ceramic honeycomb structure 50 comprising a ceramic honeycomb body 51, whose outermost cells and predetermined numbers of cells inside the outermost cells are cells 54 sealed by a peripheral wall 52 at one-side ends and/or in intermediate portions to prevent a fluid from flowing. JP 2003-284923 A describes that this ceramic honeycomb structure 50 can enhance the activity of a catalyst carried in a short period of time, because of a short temperature elevation time from the start of operation, which is achieved by the heat insulation of the sealed cells 54 formed by the peripheral wall 52. JP 2003-284923 A describes that this ceramic honeycomb structure 50 is produced by drying and sintering an extruded honeycomb-structured green body with different shrinkage ratios between two ends to form a frustoconical ceramic honeycomb body 51, machining a frustoconical peripheral surface of the ceramic honeycomb body to a cylindrical shape, and forming a peripheral wall 52 by a coating material such as a ceramic cement, etc. on a peripheral surface 51a thereof. JP 2003-284923 A lists cordierite, ceramic materials comprising cordierite and/or ceramic fibers and an amorphous oxide matrix (colloidal silica, colloidal alumina, etc.), etc., as materials for the peripheral wall 52.

However, when the invention described in JP 2003-284923 A is applied to a ceramic honeycomb body comprising cell walls having as high porosity as, for example, 50% or more, the peripheral wall described in JP 2003-284923 A cannot provide the ceramic honeycomb structure with sufficient isostatic strength, because cell walls are extremely brittle.

OBJECT OF THE INVENTION

Accordingly, an object of the present invention is to solve the above problems, providing a ceramic honeycomb structure having sufficient isostatic strength even though it comprises high-porosity cell walls, with a peripheral wall formed by a coating material being not easily detached from the honeycomb structure.

DISCLOSURE OF THE INVENTION

As a result of intensive research in view of the above object, the inventors have found that the application of colloidal metal oxide and a coating material in this order to form a peripheral wall on a ceramic honeycomb body provides even a ceramic honeycomb body comprising high-porosity cell walls with sufficient isostatic strength. The present invention has been completed based on such finding.

Thus, the method of the present invention for producing a ceramic honeycomb structure comprising a ceramic honeycomb body having large numbers of longitudinal cells partitioned by porous cell walls having porosity of 50% or more, and a peripheral wall formed on a peripheral surface of the ceramic honeycomb body, comprises the steps of extruding a moldable ceramic material to form a honeycomb-structured ceramic green body;

machining a peripheral portion of the green body or a sintered body obtained from the green body to remove part of cell walls in the peripheral portion, thereby obtaining a ceramic honeycomb body having longitudinal grooves on a peripheral surface;

coating a peripheral surface of the ceramic honeycomb body with colloidal metal oxide and drying it; and further coating the peripheral surface of the ceramic honeycomb body with a coating material comprising ceramic aggregate having an average particle size of 1 μm or more to form the peripheral wall.

The colloidal metal oxide is preferably colloidal silica or colloidal alumina.

The amount of the colloidal metal oxide coated is preferably $2.0 \times 10^{-3} - 150 \times 10^{-3}$ g/cm$^3$ on a solid basis, per a unit volume of the ceramic honeycomb body.

The colloidal metal oxide preferably has an average particle size of 5-100 nm.

The ceramic honeycomb structure of the present invention comprises a ceramic honeycomb body having large numbers of longitudinal cells partitioned by porous cell walls, and a peripheral wall formed on a peripheral surface of the ceramic honeycomb body, the ceramic honeycomb body having longitudinal grooves on a peripheral surface; and the peripheral wall filling the longitudinal grooves, so that cell walls constituting the grooves on the peripheral surface have smaller porosity than that of cell walls in an inner portion of the ceramic honeycomb body.

DESCRIPTION OF THE PREFERRED EMBODIMENTS

The embodiments of the present invention will be explained below, without intention of restricting the present invention thereto. Within the scope of the present invention, any modifications and improvements, etc. may be made properly based on the knowledge of those skilled in the art.

[1] PRODUCTION METHOD OF CERAMIC HONEYCOMB STRUCTURE

Figure 1A:
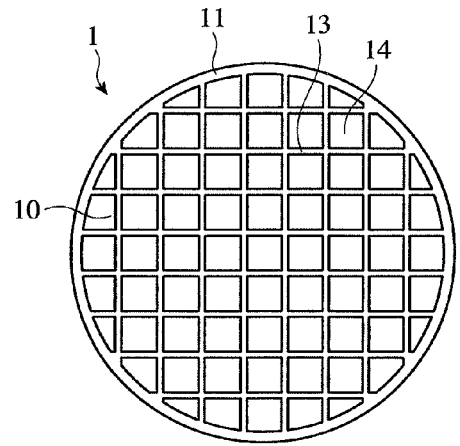
FIG. 1(a) is a schematic view longitudinally showing one example of ceramic honeycomb structures produced by the method of the present invention.
Figure 1B:
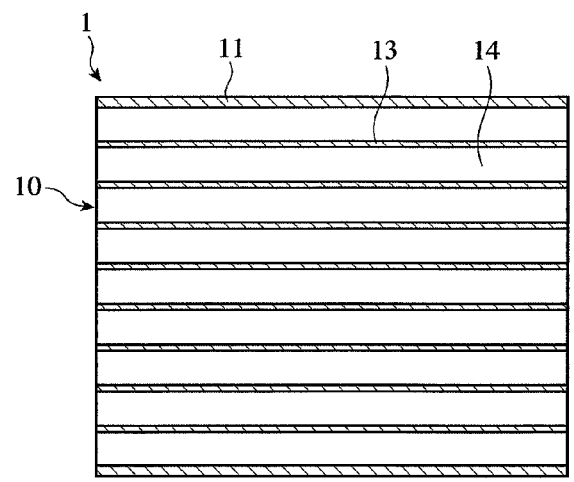
FIG. 1(b) is a schematic, longitudinal cross-sectional view showing one example of ceramic honeycomb structures produced by the method of the present invention.

The method of the present invention for producing a ceramic honeycomb structure 1 comprising a ceramic honeycomb body 10 having large numbers of longitudinal cells 14 partitioned by porous cell walls 13 having porosity of 50% or more, and a peripheral wall 11 formed on a periphery of the ceramic honeycomb body 10 as shown in FIGS. 1(a) and 1(b), comprises the steps of (a) extruding a moldable ceramic material to form a honeycomb-structured ceramic green body;

(b) machining a peripheral portion of the green body or a sintered body obtained from the green body to remove part of cell walls in the peripheral portion, thereby obtaining a ceramic honeycomb body having longitudinal grooves on a peripheral surface; and (c) coating a peripheral surface of the ceramic honeycomb body with colloidal metal oxide, and drying it, and further coating the peripheral surface of the ceramic honeycomb body with a coating material comprising ceramic aggregate having an average particle size of 1 µm or more to form the peripheral wall.

(a) Formation of Green Body

The honeycomb-structured ceramic green body is produced by extruding a moldable ceramic material. Ceramic powder is fully dry-mixed with a binder, a lubricant, and if necessary, a pore-forming material, and sufficiently blended with water to form a plasticized ceramic material. This ceramic material is extruded, cut to a predetermined length, and dried to obtain a honeycomb-structured ceramic green body integrally comprising a peripheral wall and cell walls.

(b) Production of Ceramic Honeycomb Body

Figure 2A:
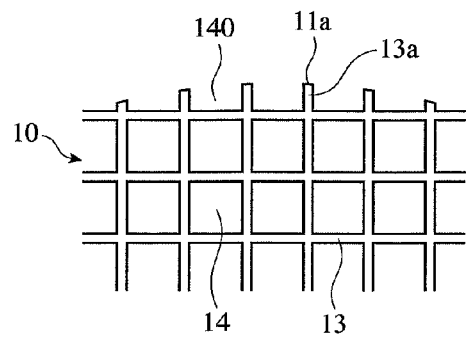
FIG. 2(a) is an enlarged schematic view showing part of an end surface of a ceramic honeycomb body produced by the method of the present invention.
Figure 2B:
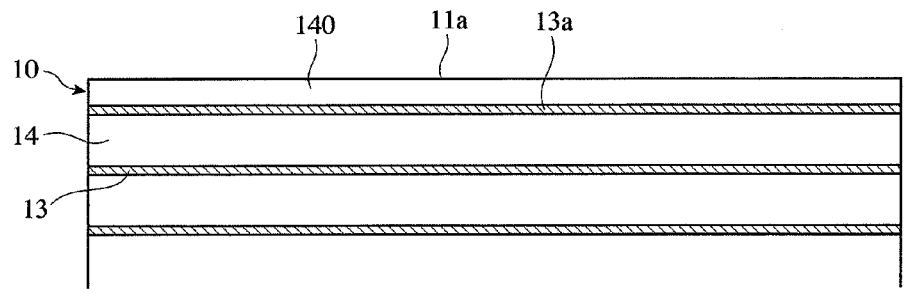
FIG. 2(b) is an enlarged, longitudinal, partial cross-sectional view showing a ceramic honeycomb body produced by the method of the present invention.

The honeycomb-structured ceramic green body is sintered to provide a sintered body having porosity of 50% or more. This sintered body is deprived of part of cell walls in the peripheral portion by machining, to form a ceramic honeycomb body 10 having longitudinal grooves 140 on a peripheral surface 11a as shown in FIGS. 2(a) and 2(b). Though a peripheral surface is machined after the green body is sintered in this example, the green body before sintering may be machined and then sintered to form the ceramic honeycomb body 10.

Materials preferable for the ceramic honeycomb body 10 include cordierite, alumina, silica, silicon nitride, silicon carbide, aluminum titanate, LAS, etc. Among them, ceramic comprising cordierite as a main crystal phase is most preferable because it is inexpensive and has excellent heat resistance and chemical stability.

(c) Formation of Peripheral Wall (i) Application of Colloidal Metal Oxide

Figure 3A:
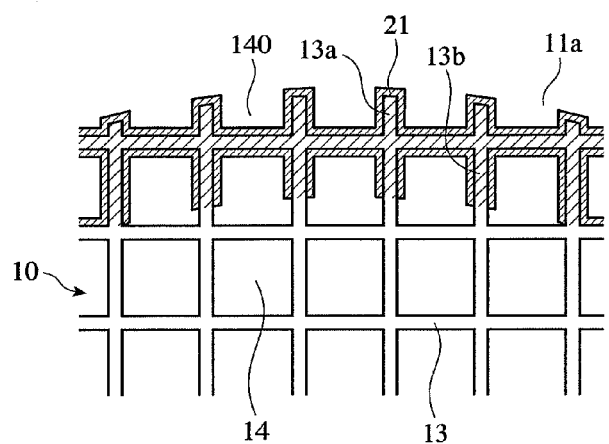
FIG. 3(a) is a schematic view longitudinally showing grooves coated with colloidal metal oxide on a peripheral surface of the ceramic honeycomb body.
Figure 3B:
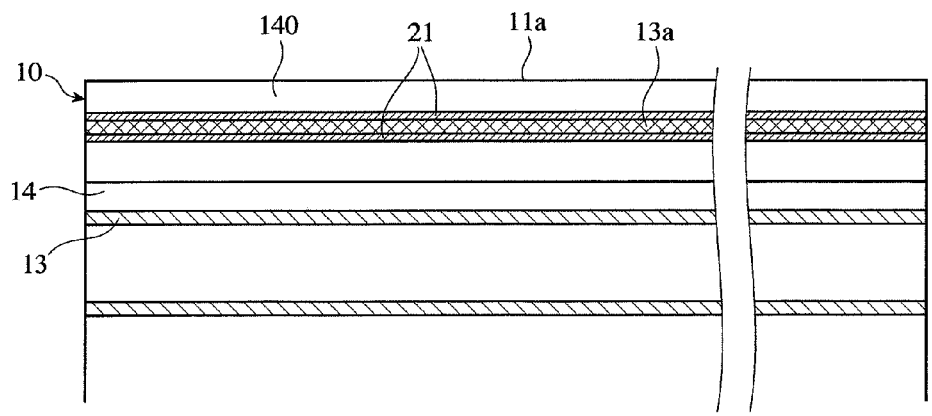
FIG. 3(b) is a longitudinal, partial cross-sectional view showing grooves coated with colloidal metal oxide on a peripheral surface of the ceramic honeycomb body.

As shown in FIGS. 3(a) and 3(b), colloidal metal oxide 21 is applied to grooves 140 on a peripheral surface 11a of the ceramic honeycomb body 10 by a brush, a roller, etc. The colloidal metal oxide 21 applied intrude into pores in cell walls 13a constituting the grooves 140 on the peripheral surface 11a as well as in cell walls 13b inside the cell walls 13a, thereby clogging the pores to increase the strength of cell walls 13a on the peripheral surface 11a. Colloidal metal oxide 21 applied to the grooves 140 is dried by spontaneous drying, hot-air drying in a drying furnace, etc.

The colloidal metal oxide 21 includes colloidal silica, colloidal alumina, titania sol, water glass, etc. Among them, colloidal silica and colloidal alumina are preferable. The colloidal metal oxide 21 is used preferably in the form of an aqueous dispersion, with the concentration of a solid component properly adjusted to have viscosity suitable for coating.

The amount of colloidal metal oxide 21 coated is preferably $2.0 \times 10^{-3}$ g/cm$^3$ to $150 \times 10^{-3}$ g/cm$^3$ on a solid basis, per a unit volume of the ceramic honeycomb body 10. When the amount of the coating is less than $2.0 \times 10^{-3}$ g/cm$^3$ on a solid basis less, pores in the cell walls 13a constituting the grooves 140 and in the cell walls 13b inside the cell walls 13a may not be sufficiently clogged, failing to obtain sufficient isostatic strength. On the other hand, when it exceeds $150 \times 10^{-3}$ g/cm$^3$, a large amount of colloidal metal oxide 21 fills the grooves 140, resulting in low heat shock resistance. The amount of the coating is preferably $4.0 \times 10^{-3}$ g/cm$^3$ to $90 \times 10^{-3}$ g/cm$^3$ on a solid basis. The amount [g/cm$^3$] of a solid component coated per a unit volume is a value obtained by dividing the solid-basis amount [g] of colloidal metal oxide 21 coated by the volume [cm$^3$] of the ceramic honeycomb body, which is expressed, for example, by $[(\pi/4) \times D^2 \times L]$ in the case of a cylindrical shape having an outer diameter of D and a length of L.

The colloidal metal oxide 21 preferably has a particle size of 5-100 nm. The use of colloidal metal oxide 21 having a particle size in such a range makes it easy for the colloidal metal oxide 21 enter pores in the cell walls 13a constituting the grooves 140, resulting in sufficient isostatic strength. The particle size of less than 5 nm undesirably decreases heat shock resistance. On the other hand, the particle size exceeding 100 nm makes it difficult for the colloidal metal oxide to enter pores in the cell walls 13a constituting the grooves 140, resulting in insufficient clogging of pores in the cell walls 13a, and thus likely failing to obtain sufficient isostatic strength. The particle size is preferably 10-90 nm.

(ii) Application of Coating Material

Figure 4A:
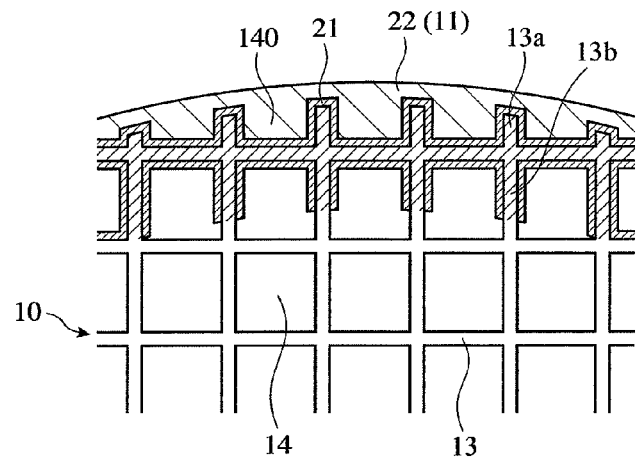
FIG. 4(a) is a schematic view longitudinally showing grooves coated with colloidal metal oxide and a coating material on a peripheral surface of the ceramic honeycomb body.
Figure 4B:
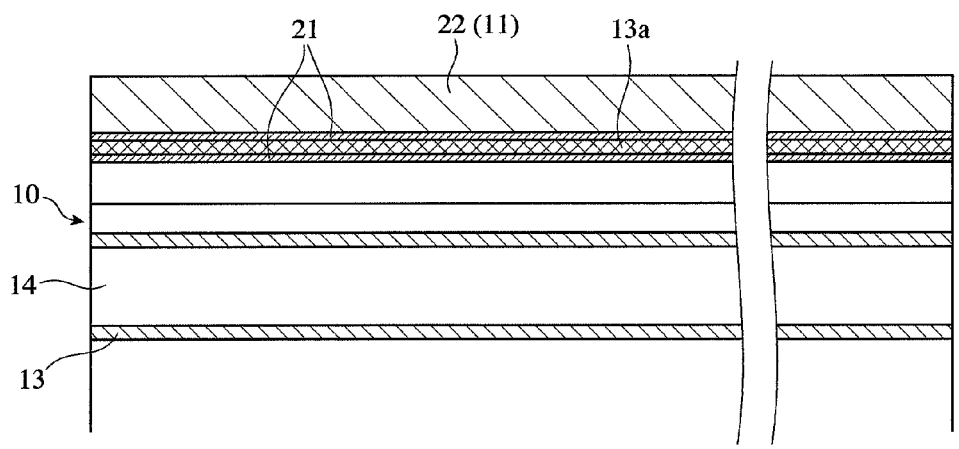
FIG. 4(b) is a longitudinal, partial cross-sectional view showing grooves coated with colloidal metal oxide and a coating material on a peripheral surface of the ceramic honeycomb body.

As shown in FIGS. 4(a) and 4(b), a coating material 22 is applied in a thickness of 0.1-3 mm onto the dried colloidal metal oxide 21 to fill the grooves 140 on the peripheral surface 11a of the ceramic honeycomb body 10. The applied coating material 22 is dried by a known method such as hot-air drying, microwave drying, etc. to remove moisture in the coating material 22, thereby obtaining a ceramic honeycomb structure 1 having a peripheral wall 11.

The coating material 22 used is a paste obtained by blending ceramic aggregate having an average particle size of 1 µm or more, colloidal silica or colloidal alumina, a binder, water, and if necessary, a dispersant, ceramic fibers, etc. The use of ceramic aggregate having an average particle size of 1 µm or more in the coating material 22 increases the strength of the peripheral wall 11, and thus the isostatic strength of the ceramic honeycomb structure 1. However, when the average particle size of the ceramic aggregate is less than 1 µm, a large amount of colloidal silica or colloidal alumina is needed to bind the ceramic aggregate, providing the peripheral wall 11 with low heat shock resistance. On the other hand, ceramic aggregate having too large an average particle size provides the peripheral wall 11 with low strength, resulting in easy detachment of the peripheral wall 11 from the ceramic honeycomb structure. Accordingly, the average particle size of the ceramic aggregate is preferably 2-50 µm.

Materials for the ceramic aggregate used in the coating material 22 may be the same as or different from those of the ceramic honeycomb body 10, preferably cordierite, alumina, mullite, silica, etc. The use of a material having a smaller thermal expansion coefficient than that of the ceramic honeycomb body 10 preferably provides high heat shock resistance during use. For example, amorphous silica is preferable.

When colloidal metal oxide 21 applied to the grooves 140 is the same as ceramic aggregate in the coating material 22 applied thereon, the colloidal metal oxide 21 and the coating material 22 preferably have good adhesion to the cell walls 13a, resulting in high bonding strength between the cell walls 13a and the peripheral wall 11.

In the ceramic honeycomb structure 1 produced by the method of the present invention, the colloidal metal oxide 21 applied to cell walls 13a constituting the longitudinal grooves 140 on the peripheral surface 11a intrude into pores in the cell walls 13a as well as in the cell walls 13b inside the cell walls 13a, and are strongly bonded thereto. As a result, colloidal metal oxide 21 and the coating material 22 applied thereon are integrated with the cell walls 13a, resulting in high adhesion (bonding strength) between the cell walls 13a and the peripheral wall 11. Accordingly, even a ceramic honeycomb structure 1 comprising cell walls 13 having as high porosity as 50% or more has extremely high isostatic strength because of a peripheral wall 11 formed by the colloidal metal oxide 21 and the coating material 22 applied thereon, so that the peripheral wall 11 is not easily detached from the peripheral surface 11a of the ceramic honeycomb structure.

Figure 5:
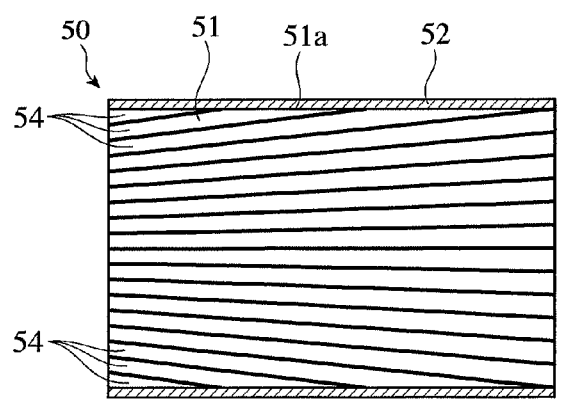
FIG. 5 is a schematic cross-sectional view showing the ceramic honeycomb structure described in JP 2003-284923 A.

When the method of the present invention is used to produce a ceramic honeycomb structure 50 having cells 54 whose ends on one side are sealed by a peripheral wall 52 as shown in FIG. 5, the detachment of the peripheral wall can be prevented, and cells sealed by the peripheral wall exhibit higher heat insulation, because colloidal metal oxide applied to the grooves of the sealed cells 54 intrude into pores of cell walls constituting the grooves, and because the pores of the cell walls are clogged by the coating material applied thereon. Accordingly, the ceramic honeycomb structure 50 enjoys such high-speed temperature elevation that high catalytic activity can be achieved in a short period of time from the start of operation.

[2] CERAMIC HONEYCOMB STRUCTURE

As shown in FIGS. 1(a), 1(b), 2(a) and 2(b), the ceramic honeycomb structure 1 of the present invention comprises a ceramic honeycomb body 10 having large numbers of longitudinal cells 14 partitioned by porous cell walls 13, and a peripheral wall 11 formed on a peripheral surface 11a of the ceramic honeycomb body 10, the ceramic honeycomb body 10 having longitudinal grooves 140 on the peripheral surface 11a; and the peripheral wall 11 being filled in the longitudinal grooves 140, so that cell walls 13a constituting the grooves 140 on the peripheral surface 11a have smaller porosity than that of cell walls 13 in an inner portion of the ceramic honeycomb body 10.

The porosity of cell walls 13 in the ceramic honeycomb structure 1 is preferably 50% or more. Also, it is preferably 80% or less to provide the ceramic honeycomb structure 1 with sufficient strength. Because the colloidal metal oxide 21 intrudes into cell walls 13a constituting the grooves 140 on the peripheral surface 11a of the ceramic honeycomb body 10, the porosity of the cell walls 13a is smaller than the porosity of cell walls 13 in an inner portion of the ceramic honeycomb body 10. To have sufficient isostatic strength, the porosity of cell walls 13a constituting the grooves 140 on the peripheral surface 11a is preferably 0.9 times or less, more preferably 0.8 times or less, the porosity of cell walls 13 in an inner portion of the ceramic honeycomb body 10. To prevent the deterioration of heat shock resistance, the porosity of cell walls 13a constituting the grooves 140 on the peripheral surface 11a is preferably 0.1 times or more the porosity of cell walls 13 in an inner portion of the ceramic honeycomb body 10.

Because the colloidal metal oxide 21 enters not only pores of the cell walls 13a constituting the grooves 140 on the peripheral surface 11a of the ceramic honeycomb body 10, but also pores of cell walls 13b inside the cell walls 13a, the porosity of the inside cell walls 13b is also preferably smaller than the porosity of the cell walls 13 in an inner portion of the ceramic honeycomb body 10, like the porosity of cell walls 13a constituting the grooves 140 of the peripheral surface 11a. Up to 20 cells below the peripheral surface 11a preferably have cell walls 13b having smaller porosity than that of cell walls 13 in an inner portion of the ceramic honeycomb body 10. More than 20 such cells lead to large pressure loss. The number of such cells is preferably up to 15, more preferably up to 10. The porosity of the cell walls 13b preferably becomes larger from the peripheral surface 11a toward inside gradually or stepwise.

The cell walls 13 of the ceramic honeycomb body 10 preferably have thickness of 0.1-0.4 mm, and a cell pitch of 1-3 mm. The ceramic honeycomb body 10 with such structure more effectively exhibits high isostatic strength.

[3] EXAMPLES

The present invention will be explained in further detail by Examples below, without intention of restricting the present invention thereto.

Example 1

(1) Production of Ceramic Honeycomb Body

Kaolin powder, talc powder, silica powder and alumina powder were mixed to form a cordierite-forming material powder comprising 50% by mass of $SiO_2$, 36% by mass of $Al_2O_3$, and 14% by mass of MgO. This material powder was fully dry-mixed with methylcellulose and hydroxypropyl methylcellulose as a binder, a lubricant, and a foamed resin as a pore-forming material, and then sufficiently blended with water to prepare a plasticized ceramic material. This ceramic material was extruded, cut to a predetermined length, and dried to obtain a honeycomb-structured ceramic green body comprising a peripheral portion integral with cell walls. This green body was sintered, and machined to remove part of cell walls from the peripheral portion, thereby obtaining a cordierite honeycomb body comprising longitudinal grooves on a peripheral surface, which had an outer diameter of 266 mm, a length of 305 mm, a cell wall thickness of 0.3 mm, a cell pitch of 1.57 mm, and a cell wall porosity of 61%.

(2) Formation of Peripheral Wall

An aqueous dispersion of colloidal silica (average particle size: 15 nm, and solid concentration: 20% by mass) as colloidal metal oxide was applied to a peripheral surface of each of the resultant four ceramic honeycomb bodies, in an amount of $20 \times 10^{-3}$ $g/cm^3$ on a solid basis per a unit volume of the ceramic honeycomb body. After the applied colloidal metal oxide was dried at room temperature for 2 hours, it was coated with a coating material obtained by blending 100 parts by mass of ceramic aggregate (silica powder having an average particle size of 15 μm) with 12 parts by mass of colloidal silica on a solid basis, and then blending 100 parts by mass in total of ceramic aggregate and colloidal silica with 1.2 parts by mass of methylcellulose together with water. The coated material was dried at 130° C. for 2 hours to produce four ceramic honeycomb structures.

The ceramic honeycomb structures were evaluated with respect to isostatic strength, and the adhesion and heat shock resistance of the peripheral wall. Also, with respect to the ceramic honeycomb structure used for the above evaluation, samples were cut out of cell walls in an inner portion of the ceramic honeycomb body, and cell walls in the grooves on the peripheral surface, to measure their porosities by mercury porosimetry. Further, cell walls in the peripheral portion were cut out for observation by an electron microscope, to count how many cells having walls into which colloidal metal oxide intruded existed from below the peripheral surface toward inside.

Isostatic Strength

The isostatic strength test was conducted under the automobile standards M505-87 of the Japanese Automotive Standards Organization (JASO). Both ends of the ceramic honeycomb structure were sealed by 20-mm-thick aluminum plates abutting its longitudinal both end surfaces, and a 2-mm-thick rubber sheet was closely attached to a peripheral wall surface of the ceramic honeycomb structure. This sample was placed in a pressure-resistant container, into which water was introduced to isostatically exert pressure onto the peripheral wall surface. The pressure at which the ceramic honeycomb structure was broken was regarded as isostatic strength, which was evaluated by the following standards. The results are shown in Table 1.

Excellent: The isostatic strength was 2 MPa or more.
Good: The isostatic strength was 1.5 MPa or more and less than 2 MPa.
Fair: The isostatic strength was 1.0 MPa or more and less than 1.5 MPa.
Poor: The isostatic strength was less than 1.0 MPa.

Adhesion

The ceramic honeycomb structure was cut at three arbitrary points perpendicularly to the longitudinal direction, and the resultant three cross sections were observed by the naked eye with respect to gaps between the peripheral wall and the ceramic honeycomb body, thereby evaluating the adhesion of the peripheral wall to the ceramic honeycomb body by the following standards.

Excellent: There were no gaps in all of three cross sections.
Good: There were one or more gaps in one of three cross sections.
Fair: There were one or more gaps in two of three cross sections.
Poor: There were one or more gaps in all of three cross sections.

Heat Shock Resistance

Three ceramic honeycomb structures were heated at a constant temperature for 30 minutes in an electric furnace, and then rapidly cooled to room temperature to observe cracks by the naked eye for the evaluation of heat shock resistance. Because cracking occurs more at a higher temperature, the heating temperature was elevated by every 25° C. until cracking occurred. The same evaluation was conducted on three samples, and the difference between the heating temperature and room temperature in a sample, in which cracking occurred at the lowest temperature among the three samples, was regarded as a heat shock resistance temperature. The heat shock resistance temperature was evaluated by the following standards.

Excellent: The heat shock resistance temperature was 600° C. or higher.
Good: The heat shock resistance temperature was 550° C. or higher and lower than 600° C.
Fair: The heat shock resistance temperature was 500° C. or higher and lower than 550° C.
Poor: The heat shock resistance temperature was lower than 500° C.

Examples 2-15 and Comparative Examples 3-7

Ceramic honeycomb structures were produced in the same manner as in Example 1, except for changing the type and solid-base amount of colloidal metal oxides applied, and the type and average particle size of ceramic aggregates in the coating material as shown in Table 1, and their isostatic strength, peripheral wall adhesion, and heat shock resistance were evaluated. The colloidal metal oxide was used in these Examples in the form of an aqueous dispersion having a solid concentration of 20% by mass.

Comparative Example 1

A ceramic honeycomb structure was produced in the same manner as in Example 1, except that a coating material obtained by changing the average particle size of silica powder used as ceramic aggregate from 15 μm to 20 μm was directly applied to a peripheral surface of the ceramic honeycomb body without applying colloidal metal oxide, and its isostatic strength, peripheral wall adhesion, and heat shock resistance were evaluated.

Comparative Example 2

A ceramic honeycomb structure was produced in the same manner as in Comparative Example 1, except that after a coating material directly applied to a peripheral surface of the ceramic honeycomb body was dried, colloidal silica (average particle size: 20 nm, and solid concentration: 20% by mass) as colloidal metal oxide was applied thereonto in an amount of $50 \times 10^{-3}$ g/cm$^3$ on a solid basis per a unit volume of the ceramic honeycomb body, and then dried, and its isostatic strength, peripheral wall adhesion, and heat shock resistance were evaluated.

TABLE 1

| | Colloidal Metal Oxide Applied to Grooves on Peripheral Surface | | |
| --- | --- | --- | --- |
| No. | Type | Amount of Solid Component Coated[1] ($\times 10^{-3}$ g/cm$^3$) | Average Particle Size (nm) |
| Example 1 | Colloidal Silica | 20 | 15 |
| Example 2 | Colloidal Silica | 20 | 20 |
| Example 3 | Colloidal Alumina | 20 | 25 |
| Example 4 | Colloidal Silica | 20 | 100 |
| Example 5 | Colloidal Silica | 20 | 5 |
| Example 6 | Colloidal Silica | 150 | 20 |
| Example 7 | Colloidal Silica | 2.0 | 20 |
| Example 8 | Colloidal Silica | 50 | 60 |
| Example 9 | Colloidal Silica | 50 | 2 |
| Example 10 | Colloidal Silica | 155 | 20 |
| Example 11 | Colloidal Silica | 1.0 | 20 |
| Example 12 | Colloidal Silica | 20 | 20 |
| Example 13 | Colloidal Silica | 20 | 20 |
| Example 14 | Colloidal Silica | 20 | 20 |
| Example 15 | Colloidal Alumina | 20 | 20 |
| Com. Ex. 1 | — | — | — |
| Com. Ex. 2 | — | — | — |
| Com. Ex. 3 | Colloidal Silica | 50 | 20 |
| Com. Ex. 4 | Colloidal Silica | 50 | 200 |
| Com. Ex. 5 | Colloidal Silica | 50 | 2 |
| Com. Ex. 6 | Colloidal Silica | 160 | 20 |
| Com. Ex. 7 | Colloidal Silica | 1.0 | 20 |

Note:
[1]The amount of a solid component coated per a unit volume of a ceramic honeycomb body.

TABLE 1-continued

| | Coating Material | | Evaluation Results | |
|---|---|---|---|---|
| No. | Type of Ceramic Aggregate | Average Particle Size (μm) | Porosity of Cell Walls (%) Inner Portion[2] | Grooves[3] |
| Example 1 | Silica | 15 | 60 | 15 |
| Example 2 | Silica | 15 | 58 | 20 |
| Example 3 | Silica | 15 | 59 | 22 |
| Example 4 | Silica | 15 | 59 | 46 |
| Example 5 | Silica | 15 | 58 | 8 |
| Example 6 | Silica | 15 | 58 | 15 |
| Example 7 | Silica | 20 | 58 | 30 |
| Example 8 | Silica | 20 | 58 | 25 |
| Example 9 | Silica | 20 | 58 | 5 |
| Example 10 | Silica | 20 | 58 | 10 |
| Example 11 | Silica | 20 | 60 | 35 |
| Example 12 | Cordierite | 50 | 60 | 22 |
| Example 13 | Cordierite | 80 | 60 | 22 |
| Example 14 | Cordierite | 1 | 60 | 22 |
| Example 15 | Cordierite | 15 | 75 | 30 |
| Com. Ex. 1 | Silica | 20 | 60 | 55 |
| Com. Ex. 2[4] | Silica | 20 | 60 | 55 |
| Com. Ex. 3 | Silica | 0.5 | 60 | 20 |
| Com. Ex. 4 | Silica | 0.5 | 60 | 30 |
| Com. Ex. 5 | Silica | 0.5 | 60 | 10 |
| Com. Ex. 6 | Silica | 0.5 | 60 | 20 |
| Com. Ex. 7 | Silica | 0.5 | 60 | 20 |

Note:
[2]Cells in the inner portion of the ceramic honeycomb body.
[3]Cells in grooves on the peripheral surface.
[4]After the coated material was dried, colloidal metal oxide was applied.

| | Evaluation Results | | | |
|---|---|---|---|---|
| No. | Number of Intruded Cells[1] | Isostatic Strength | Adhesion | Heat Shock Resistance |
| Example 1 | 16 | Excellent | Excellent | Excellent |
| Example 2 | 15 | Excellent | Excellent | Excellent |
| Example 3 | 14 | Excellent | Good | Excellent |
| Example 4 | 12 | Good | Excellent | Excellent |
| Example 5 | 18 | Excellent | Excellent | Good |
| Example 6 | 25 | Excellent | Excellent | Excellent |
| Example 7 | 9 | Excellent | Excellent | Excellent |
| Example 8 | 19 | Good | Excellent | Excellent |
| Example 9 | 21 | Excellent | Excellent | Fair |
| Example 10 | 27 | Excellent | Excellent | Good |
| Example 11 | 7 | Good | Good | Good |
| Example 12 | 15 | Good | Good | Good |
| Example 13 | 15 | Fair | Fair | Good |
| Example 14 | 15 | Excellent | Good | Fair |
| Example 15 | 15 | Good | Good | Good |
| Com. Ex. 1 | — | Poor | Poor | Poor |
| Com. Ex. 2 | — | Poor | Poor | Poor |
| Com. Ex. 3 | 20 | Excellent | Excellent | Poor |
| Com. Ex. 4 | 15 | Fair | Excellent | Poor |
| Com. Ex. 5 | 25 | Excellent | Excellent | Poor |
| Com. Ex. 6 | 30 | Excellent | Excellent | Poor |
| Com. Ex. 7 | 7 | Good | Good | Poor |

Note:
[1]The number of cells into which colloidal metal oxide intruded.

As is clear from Table 1, the ceramic honeycomb structures of Examples 1-15 each obtained by applying colloidal metal oxide to grooves on a peripheral surface and then applying a coating material comprising ceramic particles having an average particle size of 1 μm or more onto the colloidal metal oxide layer had sufficient isostatic strength, peripheral wall adhesion and heat shock resistance. On the other hand, Comparative Example 1, in which the above coating material was directly applied to grooves on a peripheral surface without applying colloidal metal oxide, did not have sufficient isostatic strength, and was low in peripheral wall adhesion and heat shock resistance. Like Comparative Example 1, Comparative Example 2, in which the coating material was directly applied to grooves on a peripheral surface, and colloidal metal oxide was applied thereonto, did not have sufficient isostatic strength. The ceramic honeycomb structures of Comparative Examples 3-7 each obtained by applying colloidal metal oxide to grooves on a peripheral surface, and applying a coating material comprising ceramic particles having an average particle size of less than 1 μm thereonto had poor heat shock resistance, despite relatively good isostatic strength and peripheral wall adhesion.

EFFECT OF THE INVENTION

Because the present invention provides a ceramic honeycomb structure having sufficient isostatic strength even when its cell walls have as high porosity as 50% or more, the peripheral wall is unlikely detached from the ceramic honeycomb body even under heat shock during use.

What is claimed is:

1. A method for producing a ceramic honeycomb structure comprising a ceramic honeycomb body having a plurality of longitudinal cells partitioned by porous cell walls having a porosity of 50% or more, and a peripheral wall formed on a peripheral surface of said ceramic honeycomb body, comprising the steps of
    extruding a moldable ceramic material to form a honeycomb-structured ceramic green body;
    machining a peripheral portion of said green body or a sintered body obtained from said green body to remove part of cell walls in the peripheral portion, thereby obtaining a ceramic honeycomb body having longitudinal grooves on a peripheral surface;
    coating said ceramic honeycomb body with a composition consisting of an aqueous dispersion of colloidal metal oxide so that the colloidal metal oxide intrudes into pores in cell walls constituting the grooves on the peripheral surface, wherein said coating clogs the pores so that the porosity of said cell walls constituting the grooves on the peripheral surface is 0.9 times or less a porosity of cell walls in an inner portion of the ceramic honeycomb body, and drying it; and
    further coating said peripheral surface coated with the composition consisting of the aqueous dispersion of colloidal metal oxide with a coating material comprising ceramic aggregate having an average particle size of 1 μm or more to form said peripheral wall.

2. The method for producing a ceramic honeycomb structure according to claim 1, wherein said colloidal metal oxide is colloidal silica or colloidal alumina.

3. The method for producing a ceramic honeycomb structure according to claim 1, wherein the amount of said colloidal metal oxide coated is $2.0\times10^{-3}$-$150\times10^{-3}$ g/cm$^3$ on a solid basis, per a unit volume of said ceramic honeycomb body.

4. The method for producing a ceramic honeycomb structure according to claim 1, wherein said colloidal metal oxide has an average particle size of 5-100 nm.

* * * * *